(12) United States Patent
Axelrod

(10) Patent No.: US 8,875,663 B2
(45) Date of Patent: Nov. 4, 2014

(54) PET CHEW PRODUCT CONTAINING NATURAL ANIMAL FIBERS, METHODS OF MANUFACTURE AND USE THEREOF

(75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 108 days.

(21) Appl. No.: 13/472,106

(22) Filed: May 15, 2012

(65) Prior Publication Data

US 2013/0305999 A1    Nov. 21, 2013

(51) Int. Cl.
*A01K 29/00* (2006.01)

(52) U.S. Cl.
USPC .......................................... 119/710; 119/711

(58) Field of Classification Search
USPC .................. 119/710, 711; 424/400, 404, 484; 426/132, 512
See application file for complete search history.

(56) References Cited

U.S. PATENT DOCUMENTS

| | | | | |
|---|---|---|---|---|
| 4,521,436 A * | 6/1985 | Lou et al. | | 426/104 |
| 4,535,725 A * | 8/1985 | Fisher | | 119/709 |
| 5,237,961 A * | 8/1993 | Sarullo | | 119/709 |
| 6,576,246 B1 * | 6/2003 | Denesuk et al. | | 424/400 |
| 6,821,538 B2 * | 11/2004 | Axelrod et al. | | 426/132 |
| 7,691,426 B2 * | 4/2010 | Axelrod et al. | | 426/132 |
| 2007/0289552 A1 * | 12/2007 | Axelrod et al. | | 119/710 |
| 2008/0233243 A1 * | 9/2008 | Axelrod et al. | | 426/72 |
| 2010/0003393 A1 * | 1/2010 | Torney et al. | | 426/576 |
| 2011/0114031 A1 * | 5/2011 | Mann | | 119/707 |

OTHER PUBLICATIONS

Kuciel et al., "Polymer biocomposites with renewable sources", Archives of Foundry Engineering, vol. 10, Mar. 2010, Krakow, Poland, pp. 53-56.
Saxena et al., "Composite Materials from Natural Resources: Recent Trends and Future Potentials", Chapter 6 of Advances in Composite Materials—Analysis of Natural and Man-Made Materials, Sep. 9, 2011, Bhopal, India, pp. 121-162.
International Search Report and Written Opinion from related PCT Appln. No. PCT/US2013/41057, dated Oct. 8, 2013.

* cited by examiner

*Primary Examiner* — Monica Williams
(74) *Attorney, Agent, or Firm* — Grossman, Tucker, Perreault & Pfleger, PLLC

(57) ABSTRACT

A pet chew product comprising a molded chewable body formed of a composition including edible resin and natural animal fibers, wherein the natural animal fibers are at least one of: (a) located within the chewable body, and (b) located on an exposed surface of the chewable body, and wherein the natural animal fibers are provided by natural animal hair.

19 Claims, 6 Drawing Sheets

PET CHEW PRODUCT CONTAINING NATURAL ANIMAL FIBERS, METHODS OF MANUFACTURE AND USE THEREOF

FIELD

The present disclosure relates to pet chew products including natural animal fibers, methods of providing pet chew products including natural animal fibers and methods of entertaining pets with pet chew products including natural animal fibers.

BACKGROUND

Animal pets, particularly dogs, rely upon smell as their primary sense, unlike humans who rely primarily on sight. Depending on the breed, a dog's sense of smell may be 1,000 to 10,000 times better than that of a human. This is due in part to dogs having up to 300 million olefactory receptors (for a bloodhound) in their nose, while a human may only have about 5 million. Further, the percentage of a dog's brain that is devoted to analyzing smells may be understood to be up to 40 times larger than compared to a human. Given a dog's keen sense of small, dogs have been trained to help locate disaster survivors, detect illegal drugs and track escaped criminals.

Dogs also have a hereditary instinct to chase wild animals, possibly due to instinctive predatory behavior and the instinct to hunt. In detecting wild animals, dogs again rely predominately on their sense of smell. For example, without even seeing a wild animal, dogs can often detect the presence of a wild animal which may be relatively close by smelling the animal's scent.

In recognizing a dog's keen sense of smell, and a dog's penchant for wild animal scents, the present disclosure provides pet dog products with a wild animal scent to entertain pet dogs.

SUMMARY

In one aspect, the present disclosure relates to pet chew products. The pet chew products may include a molded chewable body formed of a composition including edible resin and natural animal fibers, wherein the natural animal fibers are at least one of: (a) located within the chewable body, and (b) located on an exposed surface of the chewable body. The pet chew products may include an attractant scent to attract the pet, wherein the attractant scent is provided by the natural animal fibers, which includes a natural scent of a host animal from which the natural animal fibers are derived. The natural animal fibers may be provided, for example by natural animal hair, wool or silk, or combination thereof. The natural animal fibers may be present in an amount of 0.1% by weight to 50% by weight of the pet chew product. The natural animal fibers may be from a land mammal, and be in the form of a loose particulate. The natural animal fibers may have a length in a range from 0.01 mm to 100 mm. The edible resin may comprise, for example, starch, gluten, casein and gelatin.

In another aspect, the present disclosure relates to methods of providing a pet chew product. The methods may include molding a chewable body from a composition comprising edible resin, and providing the chewable body with natural animal fibers, wherein the natural animal fibers are at least one of: (a) dispersed within the chewable body, and (b) located on an exposed surface of the chewable body. The methods may include providing the pet chew product with attractant scent to attract a pet, wherein the attractant scent is provided by the natural animal fibers. The animal fibers may be dispersed within the composition prior to molding the chewable body, and/or applied to an exposed surface of the chewable body after molding the chewable body.

The methods of providing a pet chew product may further comprise mixing water with said edible resin, wherein said water is present in the range of 20% to 40% by weight of the composition; and reducing said water content, wherein after molding the composition the water is present in the range of 1% to 20% by weight of the composition. Molding of the chewable body may further comprise injection molding the chewable body using an injection molding machine. The edible resin and natural fibers may be introduced as separate components to a barrel of an extruder and mixed in the barrel of the extruder to provide an extrudate, and the extrudate may be formed into pellets prior to being introduced to the injection molding machine. Alternatively, the edible resin and natural fibers may be introduced as separate components to the barrel of the injection molding machine and mixed in the barrel of the injection molding machine. The composition may be heated before molding the chewable body, and after molding the animal fibers may be applied to the exposed surface of the chewable body prior to the composition cooling to ambient temperature. The natural animal fibers may include a natural scent of a host animal from which the natural animal fibers are derived.

In yet another aspect, the present disclosure relates to methods of entertaining pets with pet chew products including a scent of an animal from natural animal fibers. The method may include providing a pet chew product comprising edible resin and an attractant scent to attract a pet, wherein the attractant scent is provided with natural animal fibers, and providing the pet chew product to the pet.

BRIEF DESCRIPTION OF THE DRAWINGS

The detailed description below may be better understood with reference to the accompanying figures which are provided for illustrative purposes and are not to be considered as limiting any aspect of the disclosure.

DETAILED DESCRIPTION

Figure 1:
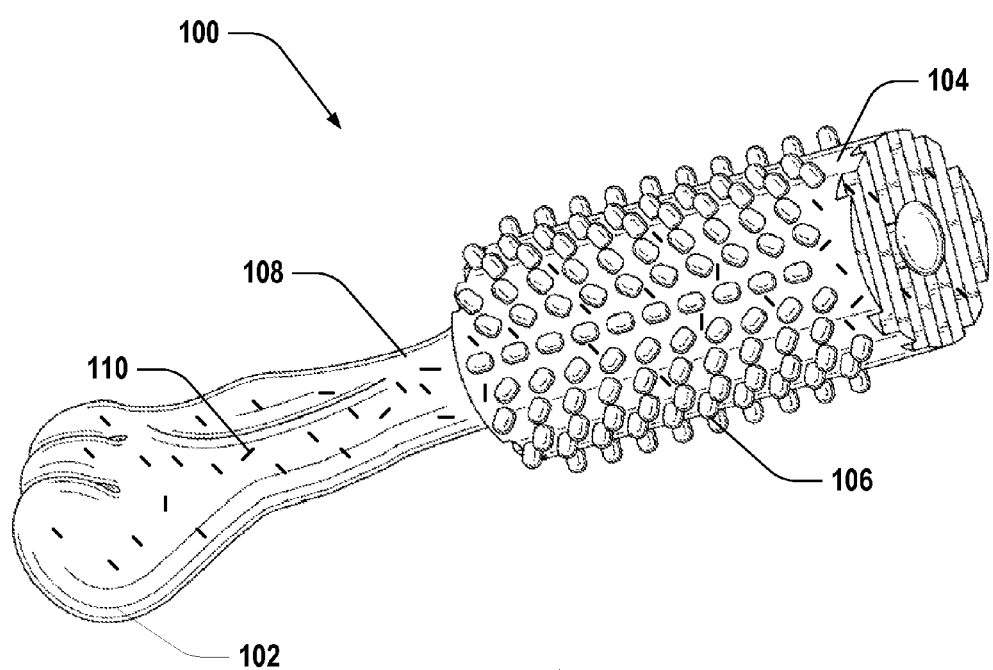
FIG. 1 illustrates a perspective view of an embodiment of a pet chew product that may incorporate natural animal fibers.

It may be appreciated that the present disclosure is not limited in its application to the details of construction and the arrangement of components set forth in the following description or illustrated in the drawings. The embodiments herein may be capable of other embodiments and of being practiced or of being carried out in various ways. Also, it may be appreciated that the phraseology and terminology used herein is for the purpose of description and should not be regarded as limiting.

The present disclosure relates to pet chew products including natural animal fibers, methods of providing pet chew products including natural animal fibers and methods of entertaining pets with pet chew products including natural animal fibers. The pet chew products and methods may include an attractant scent to attract the pet, wherein the attractant scent is provided by the natural animal fibers.

In some embodiments, the pet chew products may be formed out of a base composition, and the natural animal fibers may be within (randomly dispersed) the base composition. In other embodiments, the natural animal fibers may be present at only a particular location of the pet chew products, such as applied to an outer surface of the pet chew products. Ingredients/components and the base composition may include biocompatible resins, including synthetic or edible natural or naturally derived resin, and molded using a number of molding processes. In other embodiments, the base composition may be formed out of rawhide.

An example of a non-limiting embodiment of a pet chew product contemplated herein is illustrated in FIG. 1. The pet chew product 100 may take on a number of forms, in the illustration, the pet chew product 100 includes a bulbous end portion 102 and a cylindrical portion 104 including a number of projections 106 therefrom. Other forms may also be provided, such as bone shapes, geometric shapes or shapes simulating various food products, such as a fish, a shish-ka-bob, bacon or a rack of ribs.

As alluded to above, the pet chew product may include a biocompatible resin, which may include synthetic or natural or naturally derived resins. Biocompatible resins may include resins that do not exhibit toxic and/or injurious effects on biological systems, such as the digestive track of a pet. Such biocompatible resins may be edible but may or may not be digestible. Non-limiting examples of synthetic resin may include polyurethane, nylon and rubber (elastomer). A non-limiting example of an edible synthetic resin may include ester resins. Non-limiting examples of edible natural or naturally derived resins may include starch, gluten, casein and gelatin. In further embodiments, the pet chew product may include rawhide.

The resulting pet chew product may exhibit a sufficient hardness and ductility to be repeatedly mechanically abraded by a pet's teeth before the structural integrity of the chew is reduced and breaks into one or more pieces. In a preferred embodiment, the hardness of the molded pet chew products, as measured by ASTM D2240-05 (2010), may be in the range of Shore 70A to Shore 80D, including all values and whole number ranges therein, including e.g. 98A, 50D, etc. In particularly preferred embodiments, the hardness of the formed pet chew products may be in the range of 25 to 40 Shore D, including 30 to 33 Shore D. The pet chew products may also exhibit an elongation at break, as measured by ASTM D638-10, in the range of 0.5% to 600% and all values therein in 1% increments, such as 1% to 7%. In addition, the tensile modulus of the pet chew product, as measured by ASTM D638-10, may be in the range of $50 \times 10^3$ psi to $500 \times 10^3$ psi, including all values and ranges therein, such as $50 \times 10^3$ psi to $300 \times 10^3$ psi, in 1 psi increments. Furthermore, the flexural modulus of the pet chew products may be in the range of $50 \times 10^3$ psi to $500 \times 10^3$ psi, as measured by ASTM D790-10, including all values and ranges therein, such as $50 \times 10^3$ psi to $300 \times 10^3$ psi, in 1 psi increments. An individual pet chew product may exhibit one or more of the above properties, i.e., hardness, elongation at break, and tensile modulus.

Accordingly, it may be appreciated that with respect to dogs, such hardness values and elongation characteristics will, as noted, now allow the pet chew product to be mechanically abraded by the pet's teeth before the chew structural integrity is reduced and it naturally separates into a plurality of pieces for ingestion. In some embodiments, for example, the pet chew products may exhibit a sufficient hardness and ductility to be repeatedly mechanically abraded by the teeth of a pet for at least 30 seconds before the structural integrity of the chew is reduced such that the pet chew product breaks into one or more pieces. In some embodiments, mechanical abrasion may occur in the range of 5 minutes to 12 hours before the pet chew product breaks into one or more pieces, including all values and ranges therein, such as 5 to 10 minutes, 1 hour to 6 hours, etc. Scarring or marring of the surface of the pet chew product may occur with mechanical abrasion, although the structural integrity of the chew may remain preserved.

The aforementioned base compositions may include any carbohydrate of natural or vegetable origin. The starch may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassaya, konjac, kudzu, oca, sago, sorghum, sweet potato, taro, yams, fava beans, lentils and peas. The starch may be present between about 30-99% including all increments and values therebetween such as levels above about 50%, 85%, etc.

The starch employed herein may be raw starch, which may be understood as starch that has not seen a prior thermal molding history, such as extrusion or other type of melt processing step. The raw starch itself may also be native, which may be understood as unmodified starch recovered in the original form by extraction and not physically or chemically modified. The raw starch may also be in powder form of varying particle size, which may be understood as milled and/or pre-sifted. It should be understood that the raw starch may also have varying degrees moisture present.

Natural animal fibers may be added to the pet chew product before, during or after forming of the resin or rawhide into a pet chew product. The natural animal fibers may provide an attractant scent to attract a pet. In this regard, the fibers should be essentially untreated after being removed from the host animal, other than for possible sizing and basic washing. In the event the fibers are washed with a shampoo, the shampoo should not remove the oils from the fibers which may provide the scent, and the shampoo, or other cleansers, should not include a perfume to mask the scent. In this manner, the scent of the animal host may remain on the fibers. Thus, the fibers should not be bleached or chemically treated as to remove the scent of the host animal. As used herein, it should be understood that natural animal fibers includes animal hair (which may also referred to as fur), wool and silk which may all comprise the protein keratin.

The natural animal fibers may particularly be provided by, or comprise, essentially consist of or consist of, natural animal hair, which may be particularly from the class mammalia within the phylum chordata within the kingdom animalia. More particularly natural animal hair may include hair of non-human, wild (non-domesticated) land mammals, which may include alpaca; anteater; antelope (including gazelle); armadillo; bear (including black, brown, grizzly, panda and polar); buffalo and bison; camel; canine (including wild canines such as African wild dog, coyote, dingoe, fox, jackal and wolf); cow and cattle (including angus, holstein and jersey); deer, elk and caribou (including reindeer and white-tailed deer); donkey and mule; elephant; feline (including wild felines such as cheetah; cougar; mountain lion; puma;

feral cats; jaguar, leopard, panther, liger, lion, lynxe, ocelot and tiger); ferret, weasel and badger; giraffe; goat and sheep; hedgehog; hippopotamus; horse; hyena; llama; marsupial (including kangaroo and wallabie, koalas, opossum, possum, sugar glider, Tasmanian devil, Tasmanian tiger and wombat); meerkat; mongoose; moose; muskox; pig; primate (including ape and monkey); rabbits and hares; raccoon; red panda; rhinocerose; rodent (including beaver, capybara, chinchilla, chipmunk, coypu, dormouse, gerbil, gopher, groundhog, guinea pig, hamster, jerboa, lemming, marmot, mole, mouse, muskrat, prairie dog, rat, shrew, squirrel, vole, woodchuck, porcupine, paca, viscacha and woodchuck); shrew; skunk; sloth; tapir; warthog; yak and zebra.

It may be appreciated that the hair of each animal above may provide a distinct scent which may be distinguished from one another.

In some embodiments, at least 10% by weight, including all values and ranges from 10% to 100% by weight, of the total amount of the natural animal fibers present in the pet chew product may be applied to the surface of the base composition after processing, as illustrated further herein. In further embodiments, the natural animal fibers may also be added and mixed into the base composition before or during processing.

The natural animal fibers may be added to the base composition in the form of a loose particulate, which may have cut or otherwise formed into a loose fiber (particularly with an aspect ratio of length/width greater than 1) having a length in a range from 0.01 mm to 100 including all values and ranges therein, such as in the range of 0.1 mm to 50 mm; 0.1 mm to 25 mm; 0.1 mm to 10 mm; 0.1 mm to 5 mm; and 1 mm to 3 mm. Other ranges may include 0.1 mm to 3 mm and 0.5 mm to 2 mm.

In some embodiments, the natural animal fibers may be added in an amount of 0.1% by weight to 50.0% by weight of the total composition of the pet chew product, including all values and ranges therein, such as in the range of 0.5% by weight to 40.0% by weight; 1.0% by weight to 30.0% by weight; 5.0% by weight to 25.0% by weight, etc. The total composition of the pet chew product may be understood as the amount of base resin as well as any other additives.

Referring again to FIG. 1, the natural animal fibers 110 may be provided on the surface 108 of the pet chew product 100 and in some examples the natural animal fibers 110 may be provided through the volume of the pet chew product 100. Furthermore, the natural animal fibers 110 may be provided at selected locations, such as on raised projections 106 or at end portions 102 of the pet chew product, again either within the volume of the selected locations or on the surface of such locations.

The base composition may also include one or more additives that may include abrasive additives, breath sweeteners or compounds that may be ingested for improving oral health. Abrasive additives may include calcium carbonate, talc, sodium bicarbonate, etc. The abrasive additive may exhibit a Mohs hardness of 4 or less, including all values and ranges therein such as 0.5 to 4. In addition, the abrasive additive may be present between about 5-10% by weight of the base composition. Breath sweetening agents may also be incorporated into the base compositions herein. Such agents may include mint, spearmint, peppermint or wintergreen and may also include parsley, chlorophyll, etc. Other ingestible compounds for improving oral health may include, but are not limited to, alma, bilberry fruit, hawthorn berry, Echinacea, goldenseal, folic acid, olive leaf extract, aloe vera, cranberry, licorice root, spirulina, horsetail, coenzyme Q10, yellow dock root, alfalfa leaf, cinnamon bark and tumeric root. The compounds may also include Vitamin C alone or in combination with sodium hexametaphosphate. Breath sweetening and ingestible compounds may individually be present in the range of 0.01 to 5.0% by weight of the base composition, including all values and ranges therein at 0.01% increments. In addition, the total amount of breath sweetening or ingestible compounds may be present in the range of 0.01 to 25.0% by weight of the base composition.

Various additional additives may be added to the resins and rawhide contemplated herein. Such additives may include fiber, plasticizers, colorants, flavorants, and other olfactory stimulants in addition to the natural animal fibers. In addition, nutrient sources, such as sources of micronutrients, macronutrients and other dietary supplements may be incorporated. For example, with regard to starch based pet chew products, various additional additives may include those discussed further herein.

In some embodiments, the base composition may include cellulose. The cellulose may be, for example, a long-chain polymer of polysaccharide carbohydrate. The cellulose may also be derived or extracted from plants. The cellulose may be incorporated into the base composition between about 1-15% by weight of the base composition (understood herein to be the total weight of the base composition) and any increment or value therebetween including 4%, 10%, 11%, etc.

Emulsifiers or surfactants may also be incorporated into the base composition. The emulsifier may be present between about 1-10% by weight of the base composition and all increments or values therebetween including 3%, 4%, etc. The emulsifier may include, for example, lecithin, which may be extracted or derived from, for example, egg yolk or soy beans.

The base composition may also include a plasticizer. The plasticizer may include for example, glycerin. The plasticizer may be incorporated between about 15-30%, including all increments and values therebetween such as levels greater than 15%, 21%, 27% etc.

A humectant may also be incorporated into the base composition. The humectant may include, for example, oat fiber. The humectant may be incorporated between about 0.1-5% by weight of the base composition including all intervals and values therebetween, including 1%, 25%, etc. A humectant may be understood to be any additive that may absorb water in the material.

The base composition may also include water. The water may be introduced into the base composition between about 1-40% by weight of the base composition and any increment or value therebetween, including 4%, 20-40%, 10-20%, etc. After the product has been formed, the water may be present between 1-20% by weight of the base composition including all increments or values therebetween, such as, below 20%, 4%, 5-10%, etc.

The base composition may include a nutraceutical. The nutraceutical may be fermented soya. Fermented soya nutraceuticals are available from Bio Food, Ltd., Pine Brook, N.J. and sold under the general trademark Soynatto®. The fermented soya is present between about 1-40% by weight of the base composition, including all increments and values therebetween, including 10%, 20%, etc.

The base composition may also include saccharomyces cerevisiae, commonly known as "bakers yeast" or "brewers yeast." Saccharomyces cerevisiae is more traditionally known to ferment sugars present in flour or dough, yielding carbon dioxide and alcohol. The saccharomyces cervisiae may be present in the base composition in the range of 0.1 to 5% by weight.

The base composition may also include enzymes and/or co-enzymes which are similarly available through Bio Foods, Ltd., Pine Brook, N.J. and sold under the trademark of BT-CoQ10®. This reportedly is a biologically transformed (fermented) cell mitochondrial coenzyme and contains Coenzyme Q10 (discussed further herein), antioxidants, phytonetrients and cofactor mineral nutrients and other cell constituents. The enzymes and/or co-enzymes may be present between 0.1-10% by weight of the base composition, including all increments and values therebetween such as 1%, 5%, etc.

Many of the additives discussed above may also be incorporated into synthetic resins or rawhide, such as cellulose, plasticizers, humectants, nutraceuticals, etc. Other additives may also be introduced into the base compositions (edible or synthetic alike) as well. These additives may include vegetable matter, fruit matter, rawhide, nuts, nut bits or nut flour such as peanut flour, and animal or fish products, by-products, meal or digests, etc. Glutens may also be incorporated into the base compositions. Gluten may be understood as water-insoluble protein complex extracted from cereal grains such as maize or corn and wheat. These additives may be present individually or cumulatively between about 0.1-50% by weight of the base composition and all increments and values therebetween including 0.1-5.0%, 15%, 25%, etc.

Additionally, as alluded to above, herbs, herbal extracts, vitamins, minerals, and attractants, may be incorporated into the base compositions. For example, in the case of dogs, preferred minerals may include calcium, phosphorus, potassium, sodium, chloride, magnesium, iron, copper, manganese, zinc, iodine, selenium. However, it is to be noted that other trace minerals have been suggested, such as Co, Mo, Cd, As, Si, V, Ni, Pb and Sn. Furthermore, minerals such as potassium, calcium, phosphorous and magnesium may be required in gram amounts/day, whereas iron, zinc, copper, iodine, and selenium are only required in mg or µg/day. The chew herein can therefore be modified to reflect a higher or lower concentration of a given mineral, according to nutritional requirements.

Turning next to the herbal component, the herbs may be selected from the group consisting of St. Johns Wort, Kava Kava, Ginkgo Biloba, Ginseng (Asian or Siberian varieties), and mixtures thereof. Other herbs include Catsclaw, Camomile, Saw Palmetto, Valerina, V. Agnus-Castus, Black Cohosh, and Milk Thistle. Herbs may also include aloe, astragalus, burdock, chestnut, coriolus, versicolor, couchgrass, crampbark, dandelion root, dong quai, elecampane, evening primrose, eyebright, false unicorn root, feverfew, garlic ginger, gota kola, grape seed extract, green tea, guggulipid, hops, ivy, milk thistle, mistletoe (American Asian and European varieties), motherwort, oats, osha, passion flower, pumpkin pygeum, red clover, rosemary, sarsaparilla, skullcap, saw palmetto, stinging nettle, wild indigo, wild yam and yerba mansa. In addition, glucosamines and/or chondroitin can be added to any of the embodiments described herein.

Attractants may include compounds listed herein in addition to animal or fish digests, or other compounds that may increase an animal's interest in the base composition.

The above additives (minerals, herbs and attractants) may be present individually or cumulatively between about 0.01-25% by weight of the base composition and any increment or value therebetween including 0.01-0.5%, 10%, 20%, etc.

In another aspect, the present disclosure relates to a method of forming pet chew products including natural animal fibers. As alluded to above, the natural animal fibers may be introduced either before, after or while forming the base composition of the chew. Embodiments herein describe the incorporation of the natural animal fibers into a natural (starch) composition. However, a person of ordinary skill in the art may adapt the processes herein for use in a synthetic resin composition as well.

Figure 2:
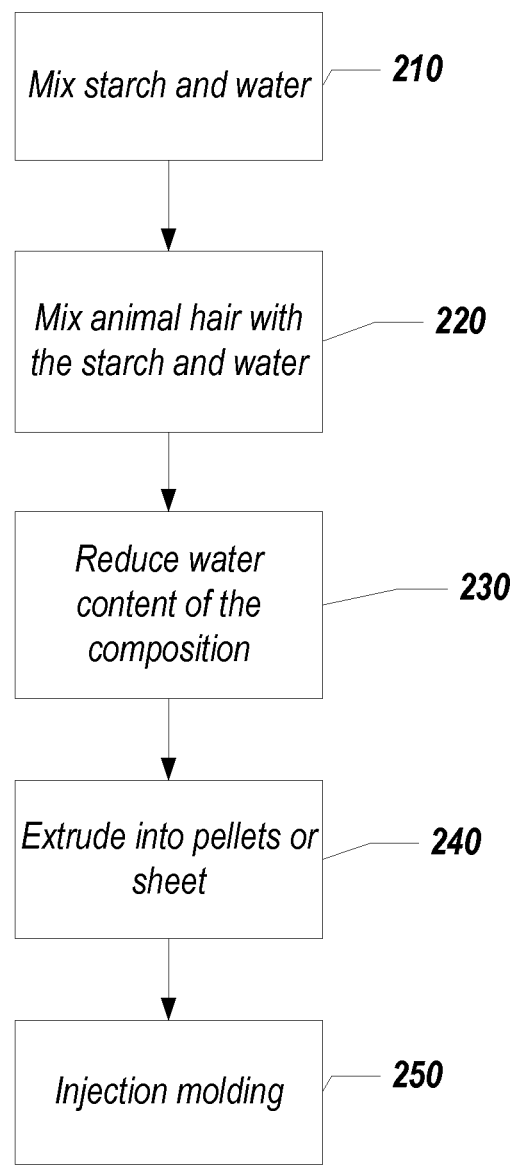
FIG. 2 illustrates an embodiment of a method of forming a pet chew product incorporating natural animal fibers.

For example, in one embodiment of forming a pet chew product, the natural animal fibers may be incorporated into a base composition comprising starch prior to molding as illustrated in the flow chart of FIG. 2. The process may begin with adjusting the water content of the starch by adding water to the starch, which may be present in the range of 20% to 40% by weight with respect to that of the starch, including all values and ranges therein, and mixing of the water with the starch material 210. The natural animal fibers may also be added to the starch and mixed therein 220. The mixing of the starch, water and/or natural animal fibers may be preformed in a preconditioner or in a plasticating device, as discussed further below.

This may then be followed by a reduction of the water content of the starch mixture 230. This reduction may be facilitated by placement of the starch mixture into a plasticating device, such as a single screw extruder, twin screw extruder, reciprocating screw injection molding machine, etc. Plastication may be understood as the input of heat, mechanical action or both, into a material, which may result in a change in the material's viscosity. In this embodiment, a twin screw or single screw extruder may be utilized at sufficient temperature to melt and plasticate the starch, as well as potentially the animal fibers. In the context of the present disclosure, where the water level charged in the extruder is preferably lowered during the course of extrusion, an extruder that is configured for venting may be employed, wherein such venting lowers the water level to a desired level. To facilitate such water level change, it may be particularly useful to apply a light vacuum to the extruder barrel at the vent port, to thereby provide a more efficient removal of water from the extrudate therein.

The resulting products of extrusion may be conveniently formed 240 in various shapes. For example, the resulting products may be formed into the shape of beads/pellets, the size of which can be made to vary in accordance with standard pelletizing equipment. Or, the resulting products of extrusion may be formed into sheets, which may then be formed into rolls, cut or punched into a desired shape.

Once extruded bead is produced, the water level of the bead exiting the extruder is less than the water level of the starch/water mixture entering the extruder. In the context of the present disclosure, it has been appreciated that by starting at the starch/water levels herein, one may effectively insure that one will ultimately proceed to injection molding, if so desired at an adequate water level to provide for a stable melt (non-degrading) and injection mold a quality starch product with improved performance characteristics.

Subsequent to recovery of the starch/water extrudate, optionally, the extrudate may be placed into a dryer at various periods of time, from 1 hour to 96 hours, including all values and ranges therein, wherein the water level of the extrudate is lowered an additional amount depending upon dryer conditions. Preferably, the water level of the starch/water extrudate may be lowered within the range of about 15% to 20% by weight of the weight of the product, at which point the extrudate is in condition for injection molding. Further drying may occur, or drying at higher temperatures to produce a final product having a moisture level in the range of 5% to 20% by weight of the weight product, including all values and ranges therein.

In some embodiments, the extruded products (the beads or pellets) may then be injection molded 250. In the step of injection molding, preferably, the injection molding technique is similarly configured to reduce moisture content once again, to a final level that is at or below about 20% by weight of the starch material. However, in preferred embodiment, the final level of water in the molded product is between about 5% to 20% by weight of the molded product, in a more preferable embodiment the water level of the molded product is set to about 10-15% by weight, and in a most preferred embodiment, the water level of the molded product is set to about 11-14%, or 11-13% by weight. It has been found, therefore, that by sequencing the loss of water, from extrusion, to injection molding, one may achieve outstanding quality for the various shaped products produced in accordance with such step-down in moisture levels through-out the melt processing history disclosed herein.

In that regard, the initial zone or zones of the injection molding machine may be cooled proximate the hopper feed section to improve the quality of the injection molded parts produced herein. Those skilled in the art will appreciate that an injection molding machine may typically contain a hopper feed section, a barrel and an output nozzle, including a plurality of heating zones in the barrel extending from the hopper section to the nozzle. The temperature in the first zone adjacent the hopper may be heated at a temperature of less than about 150° F. More preferably, the first zone adjacent the hopper may be set in the range of about 45-150° F. In an even more preferred embodiment, i.e., that situation wherein there is a first zone adjacent the hopper, and a second zone adjacent the first zone, the temperatures of the first zone may be set to about 45-70° F., and the second zone may be set to about 70-150° F. These temperatures may be achieved by the use of cooling cools placed about the barrel of the injection molding machine, said cooling cools comprising copper cooling cools with circulating water.

In a particularly preferred embodiment, the following temperature profile may be applied to a standard injection molding machine: Zone 4 (closest to hopper)=45-70° F.; Zone 3=70-150° F.; Zone 2=150-300° F.; Zone 1=275-375° F., Nozzle=275-390° F. In addition, bushing (inside the mold) is preferably set at about 325-425° F. The mold temperature may be set at 35-65° F.

Any additional additives may be added during the preconditioning process, extrusion process or the injection molding process. In some embodiments, depending on the sensitivity or mixability of the additives, different additives may be added at different steps during the process or may be added multiple times during a process.

Figure 3:
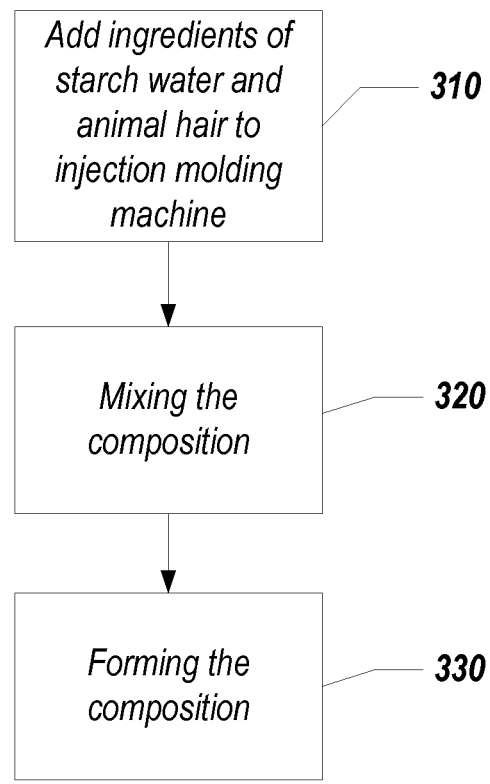
FIG. 3 illustrates a further embodiment of a method of forming a pet chew product incorporating natural animal fibers.

In other embodiments, the natural animal fibers, starch, water and any additional additives may be directly injection molded. The term "direct" as used herein with respect to injection molding refers to the molding of starch without exposing the starch to prior thermal molding histories before injection molding. However, the starch herein may, e.g., be heated for drying purposes, which would not amount to a prior thermal molding history. Accordingly, in such an embodiment, as illustrated in FIG. 3, the ingredients/components of the base (starch) composition may be introduced directly into the barrel of an injection molding machine through a hopper or other feeding device 310. Water may be added to the starch in the range of 20% by weight to 40% by weight, including all values and ranges therein. Various feeding devices for introducing the additives into the injection molding barrel may be contemplated including loss-in weight gravimetric blenders/feeders, auger feeders, venturi loaders, etc. Those skilled in the art will appreciate that an injection molding machine may typically include a barrel including a feed section, a screw and an output nozzle. The barrel may include a plurality of temperature control zones in the barrel extending from the feed section to the nozzle. The injection molding machine may include a mold having one or more cavities. The molding machine may also be vented, including a vented barrel and/or a vented mold.

The temperature adjustment may vary for each zone. For example, in one exemplary embodiment, the molding machine barrel may include 4 zones, zone 1 being the closest to the feed section and zone 4 being the closest to the nozzle. Zone 1 may be set to less than about 150° F., including any increment or value between about 35 to 150° F. including between about 46 to 150° F., 46 to 70° F., etc. Similarly zone 2 may be set between about 70 to 150° F. including any increment or value therebetween, zone 3 between about 50 to 300° F. including any increment or value therebetween, and zone 4 between about 200 to 375° F. including any increment or value therebetween. The nozzle may be set between about 250 to 390° F. including any increment or value therebetween. The bushing inside of the mold may be set between about 250 to 425° F. including any increment or value therebetween and the mold may also be set between about 35 to 65° F. including any increment or value therebetween.

Once introduced into the barrel of the molding machine the ingredients/components may be blended 320 as the screw conveys the base composition towards the mold where the base composition may be formed 330. The mold may cool the base composition. Once molded, and venting takes place, the base composition may include water between about 1-20% by weight of the product composition, including all increments and values therebetween such as 10%, 15%, etc. The base composition may be molded into any form capable of being produced in an injection molding cavity.

Figure 4:
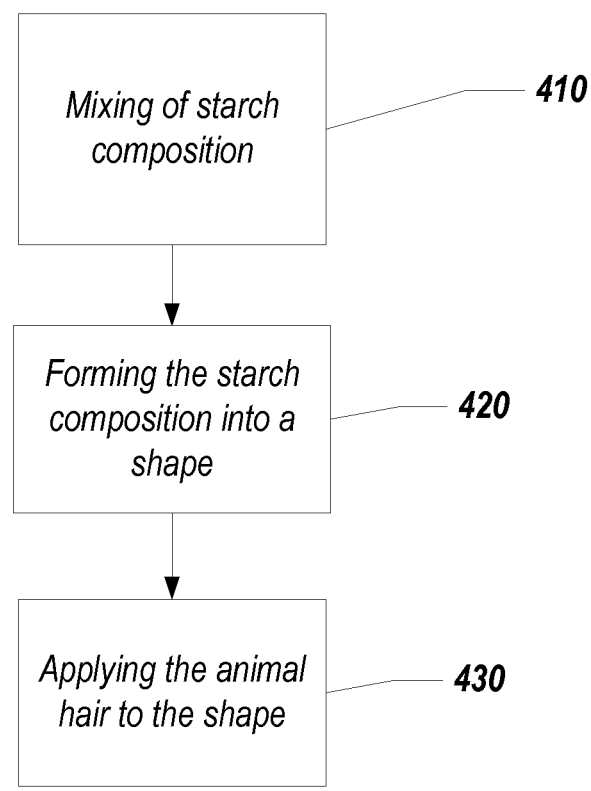
FIG. 4 illustrates yet a further embodiment of a method of forming a pet chew product incorporating natural animal fibers.

In yet another embodiment, illustrated in FIG. 4, the base composition may be formulated and plasticated (either in an extruder or an injection molding machine) 410 without adding the natural animal fibers to the base composition. The base composition may then be formed into a desired shape 420, and the natural animal fibers applied to the shape 430.

After formation of the base composition (either with or without adding natural animal fibers to the base composition), the composition may be relatively sticky and exhibit a moisture content in the range of 5% by weight of the product to 20% by weight of the product, including all values and ranges therein. In addition, the base composition may exhibit a temperature that is 10° F. to 80° F. above ambient temperature or 70° F., including all values and ranges therein. The natural animal fibers may be applied to the relatively tacky surfaces of the pet chew product (e.g. sprinkled), and adhere to the pet chew product. As the pet chew product continues to cool and/or the moisture content is reduced, the natural animal fibers may remain on the surface of the pet chew product.

In further embodiments, an adhesive composition may be applied to the surface of the pet chew product prior to applying the natural animal fibers. The adhesive composition may include, for example, pasteurized egg whites, albumin, an aqueous solution of tylose powder, or other edible adhesives. The adhesive composition may be applied to the surfaces upon which the natural animal fibers will be applied. After applying the adhesive, the natural animal fibers may be applied to the surface of the base composition and the edible adhesive may be dried.

Figure 5A:
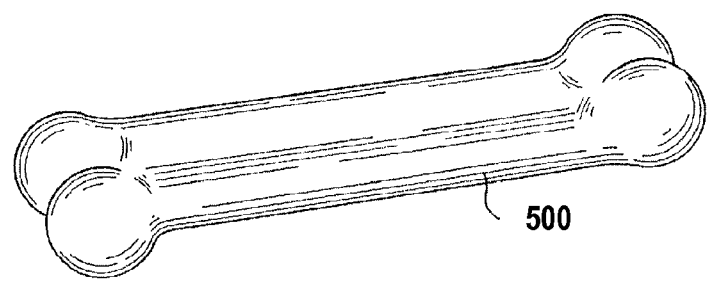
FIGS. 5a through 5c illustrates an additional embodiment of a pet chew product that may incorporate natural animal fibers.
Figure 5B:
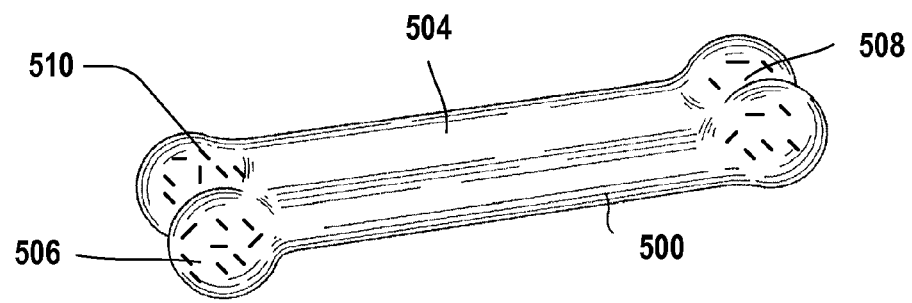
Figure 5C:
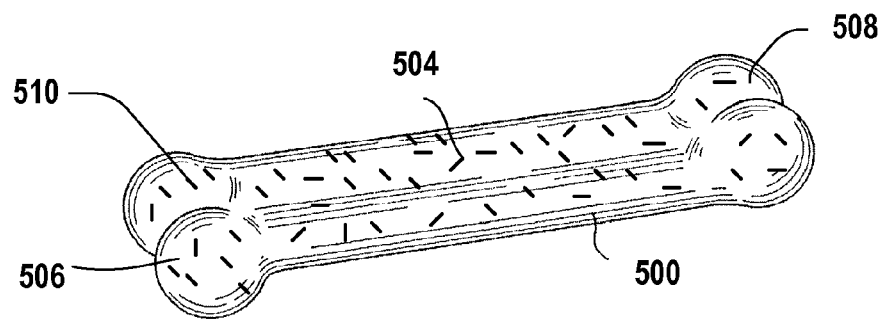

FIG. 5a illustrates an example of a pet chew product 500 after forming the chew into a desired shape, which may be produced by injection molding. As illustrated in FIG. 5b, the natural animal fibers 510 may be applied to selected surfaces of the pet chew product 500 prior to complete cooling of the pet chew product to ambient temperature. While it is illustrated in FIG. 5b that the natural animal fibers 510 is applied to bulbous ends 506, 508, of the pet chew product, the natural animal fibers may also be applied only upon longitudinal interconnecting surface 504 of the pet chew product or other selected surfaces. FIG. 5c illustrates another embodiment wherein the natural animal fibers 510 is applied to the entire exterior surface of the pet chew product 500.

Figure 6:
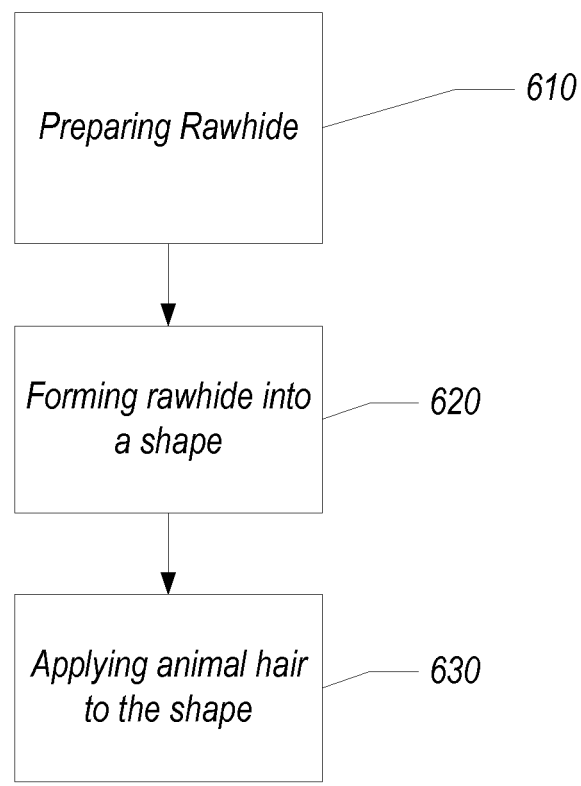
FIG. 6 illustrates another embodiment of a method of forming a pet chew product incorporating natural animal fibers.

In yet additional embodiments, an example of which is illustrated in FIG. 6, sheets of rawhide may be prepared 610. The rawhide may be obtained from the hide of an animal such a buffalo, sheep, goats, marsupials, pigs, deer, elk or cattle. The high may not be exposed to tanning and devoid of all fur, meat and fat. The hide may contain between 60 wt % to 80 wt % by water, including all values and ranges therein, and 20% to 40% by weight other substances, including all values and ranges therein, such as fibrous proteins, collagen, keratin, elastin and reticulin. Also, ash may be present between 0.01 wt % to 2.0 wt % by weight of the rawhide, including all values and ranges therein, wherein the ash may include phosphorous, potassium, sodium, arsenic, magnesium and calcium.

Generally, a hide may be prepared by any method known to those of ordinary skill in the art. One such exemplary method may include removing most of the visible fat 4 and meat from the hide. Once the fat and meat is removed the hide may be treated in a solution of calcium carbonate or calcium hydroxide, which may loosen and aid in the removal of fibers. In addition, sodium sulphide, ammonium salts or enzymes may be added to the solution. The fibers may then be removed from the hide and the hide may be rinsed. The hide may then be soaked in an aqueous solution including organic acids, inorganic acids and/or acid salts, such as potassium hydrogen tartrate and sodium bicarbonate. The hide may be rinsed again forming rawhide pieces, which may assume the shape of sheets. The pieces of rawhide may be dried or further processed wet. In addition, the pieces may be soaked in a solution including hydrogen peroxide and chlorine.

In an exemplary embodiment, the rawhide may be provided as a rawhide resin composition, wherein the rawhide may be chopped or ground into small particles or powder. The particle size may be less than about 10 mm, such as in the range of 0.001 to 10 mm, including all values and increments therein. The rawhide moisture content may be adjusted to approximately 1-20% by weight of the rawhide, including all increments and values therein, such at 8%, 10%, etc. The rawhide may then be combined with up to 20% by weight of casein, such as in the range of about 0.1 to 20% by weight, including all values and increments therein.

Caesin may be understood as a phosphoprotein of milk, wherein a phosphoprotein may be described as a group of substances that are chemically bonded to a substance containing phosphoric acid. The rawhide may also be combined with gelatin up to 10% by weight, such as in the range of 0.1 to 10% by weight, including all values and increments therein. Gelatin may be understood as a protein product produced by partial hydrolysis of collagen. In addition, attractants, such as flavorants, or nutrients may be compounded with the rawhide.

The rawhide particles may be melt processed, wherein the particles are plasticated in a plasticating device. Again, suitable plasticating devices may include injection molding machines, extruders (twin-screw, single screw, etc.) or any other device which may provide sufficient thermal-mechanical interaction to cause plastication, such as blenders. The temperature of the plasticating device may be sufficient to melt at least 10% to 100% of the particles, including all values and increments therein and may be in the range of 5 about 120 to 150° C., including all values and increments therein. In addition, the particles may be pressurized during plastication wherein the applied pressure may be in the range of about 1 to 20 MPa, including all values and increments therein. For example, back pressure may be applied during injection molding.

Once plasticated, the rawhide base composition may be formed to a desired shape 620, such as a sheet, strips or a formed article, by an extruder die, an injection mold cavity, etc. The rawhide may also be pelletized for further processing. It should be appreciated that the casein, gelatin and other additives, i.e. attractants, flavoring or nutrients, may be added to the rawhide prior to or during plastication. In addition, moisture may be removed from the rawhide during plastication or after plastication. For example, the plastication device may be vented, such as by the use of vent ports in the plastication device. After plastication, the moisture may be removed by drying, such as drying in an oven or tunnel.

The natural animal fibers may be applied to the surface of the rawhide after shaping the rawhide 630. For example, the natural animal fibers may be applied to the rawhide after plasticizing the rawhide and, optionally, a portion of the natural animal fibers may be incorporated into the rawhide during plastication during which time the natural animal fibers may also be plasticated. In other embodiments, an edible resin may be prepared with natural animal fibers which may be incorporated into the rawhide. Once the rawhide is shaped at least a portion of the surface of the rawhide may be coated with at least 10% by weight of the total amount of the natural animal fibers present in the chew.

In may now be appreciated that the present disclosure relates to pet chew products including natural animal fibers, methods of providing pet chew products including natural animal fibers and methods of entertaining pets with pet chew products including natural animal fibers, wherein the natural animal fibers includes a scent of the wild animal host to entertain the pet. The pet, such as a dog, cat or other mammal, may chew or gnaw on the pet chew product as formed herein.

In addition to the foregoing, the natural animal fibers may comprise a mixture of any or all of natural animal hair, wool or silk. Wool may be obtained from mammals such as sheep or rabbits. The selection of the particular natural animal fibers may depend on the final characteristics of the pet chew product. For example, in comparing hair and wool, the medulla may be considered pronounced in hair and almost absent in wool. Hair may also be understood to have a cuticle which is regular and smooth as opposed to an irregular cuticle for wool. Furthermore, the softness, luster, elasticity, heat retention, moisture retention and dye retention may be generally less for hair as opposed to wool.

While particular embodiments of the present invention has been described, it should be understood that various changes, adaptations and modifications can be made therein without departing from the spirit of the invention and the scope of the appended claims. The scope of the invention should, therefore, be determined not with reference to the above description, but instead should be determined with reference to the appended claims along with their full scope of equivalents. Furthermore, it should be understood that the appended claims do not necessarily comprise the broadest scope of the invention which the Applicant is entitled to claim, or the only manner(s) in which the invention may be claimed, or that all recited features are necessary.

What is claimed is:

1. A pet chew product comprising:
    a molded chewable body formed of a base composition including edible resin and independent, loose particles of natural animal hair dispersed within the edible resin;
    wherein:

the natural animal hair includes oils and a natural scent of a host animal from which the natural animal hair is derived; and the natural animal hair does not include wool.

2. The pet chew product of claim 1 wherein:

the natural animal hair is present in an amount of 0.1% by weight to 50% by weight of the pet chew product.

3. The pet chew product of claim 1 further comprising:

the edible resin comprises at least one of starch, gluten, gelatin and casein.

4. The pet chew product of claim 1 wherein:

the natural animal hair is from a land mammal.

5. The pet chew product of claim 1 wherein:

the natural animal hair has a length in a range from 0.01 mm to 100 mm.

6. The pet chew product of claim 1 wherein:

the molded chewable body is in a shape of a bone.

7. A method of forming a pet chew product comprising:

providing an edible resin;

adding independent, loose particles of natural animal hair to said edible resin such that said natural animal hair is dispersed in said edible resin providing a base composition comprising said edible resin; and molding a chewable body from said base composition;

wherein the natural animal hair includes the natural scent and oils of a host animal from which the natural animal hair is derived; and the natural animal hair does not include wool.

8. The method of claim 7 wherein:

the natural animal hair is dispersed within the edible resin prior to molding the chewable body.

9. The method of claim 7 further comprising applying the natural animal hair to an exposed surface of the chewable body after molding the chewable body.

10. The method of claim 7 further comprising:

mixing water with said edible resin, wherein said water is present in the range of 20% to 40% by weight of the composition; and reducing said water content, wherein after molding the composition the water is present in the range of 1% to 20% by weight of the composition.

11. The method of claim 7, wherein:

said molding comprises injection molding the chewable body using an injection molding machine.

12. The method of claim 11, wherein adding said natural animal hair to said edible resin comprises introducing the edible resin and natural animal hair as separate components to a barrel of an extruder and mixing the dibble resin and natural animal hair in said barrel to provide an extrudate; and said molding further comprises introducing the extrudate into the injection molding machine.

13. The method of claim 12, wherein:

the extrudate is formed into pellets prior to being introduced to the injection molding machine.

14. The method of claim 7, further comprising:

heating the base composition before said molding; and after said molding, applying natural animal hair to an exposed surface of the chewable body prior to cooling the chewable body to ambient temperature.

15. The method of claim 7 wherein:

the natural animal hair is present in an amount of 0.1% by weight to 50% by weight of the pet chew product.

16. The method of claim 7 wherein:

the natural animal hair has a length in a range from 0.01 mm to 100 mm.

17. The pet chew product of claim 1, wherein the natural animal fibers are also located on an exposed surface of the chewable body.

18. The pet chew produce of claim 1, wherein said natural animal hair is present only at select portions of said chewable body.

19. The pet chew product of claim 1, wherein said natural animal hair is present throughout said chewable body.

* * * * *